(12) United States Patent
Mann et al.

(10) Patent No.: US 10,947,165 B1
(45) Date of Patent: Mar. 16, 2021

(54) FOLIAR NUTRITIONAL COMPOSITION AND METHOD FOR USING SAME

(71) Applicants: Timothy Lee Mann, Sebring, FL (US); Richard A. Tuck, Sebring, FL (US)

(72) Inventors: Timothy Lee Mann, Sebring, FL (US); Richard A. Tuck, Sebring, FL (US)

( * ) Notice: Subject to any disclaimer, the term of this patent is extended or adjusted under 35 U.S.C. 154(b) by 16 days.

(21) Appl. No.: 15/212,219

(22) Filed: Jul. 16, 2016

Related U.S. Application Data

(60) Provisional application No. 62/194,020, filed on Jul. 17, 2015.

(51) Int. Cl.
*C05D 9/02* (2006.01)

(52) U.S. Cl.
CPC ..................... *C05D 9/02* (2013.01)

(58) Field of Classification Search
CPC ....................................................... C05D 9/02
See application file for complete search history.

(56) References Cited

U.S. PATENT DOCUMENTS

| | | | |
|---|---|---|---|
| 8,002,870 B2 * | 8/2011 | Yamashita | C05D 9/02 405/128.5 |
| 8,529,964 B1 * | 9/2013 | Mann | A01N 59/20 424/630 |

FOREIGN PATENT DOCUMENTS

CN     103250531 B   *   12/2014

OTHER PUBLICATIONS

Stănilă, Andreea, and Tania Mihăescu. "Amino Acids in Brewer's Yeast Involved in Heavy Metal Biosorption from Waste Water." Bulletin of University of Agricultural Sciences and Veterinary Medicine Cluj-Napoca. Agriculture 72.1 (2015): 221-227.*
TSDR"NUTRE_QUIK" Trademark Publication Date: Oct. 15, 2013.*

* cited by examiner

*Primary Examiner* — Jennifer A Smith
(74) *Attorney, Agent, or Firm* — Karen B. Tripp

(57) ABSTRACT

A foliar nutritional composition and method for using same for providing nutrients and/or for treating disease in plants. The foliar nutritional composition comprises a metal salt complexed with amino acids from hydrolyzed yeast extract. The metal salt is selected for high solubility using a salt of a metal selected from the group consisting of copper, nickel, zinc, iron, manganese, and combinations thereof. Preferred metal salt are nitrates, chlorides, and combinations thereof. In the method, an aqueous solution of this composition is sprayed on the plant foliage and absorbed by the plant.

1 Claim, No Drawings

FOLIAR NUTRITIONAL COMPOSITION AND METHOD FOR USING SAME

RELATED APPLICATION

This application claims priority from U.S. Provisional Application Ser. No. 62/194,020 filed Jul. 17, 2015, and is a continuation in part of U.S. patent application Ser. No. 15/132,643, filed Apr. 19, 2016, pending.

FIELD OF THE INVENTION

The present invention relates to foliar nutritional compositions and methods for providing nutrients, preventing disease in plants and enhancing the resistance and/or tolerance of plants to disease, as well as treating, suppressing, and/or controlling plant disease inhibited by metals, using a foliar nutritional composition according to the present invention.

BACKGROUND OF THE INVENTION

Certain metals, such as iron, copper, zinc, manganese and nickel, are recognized as essential for plant growth. The range for such metals in most plant tissue has been considered low and may in such amounts often be considered readily available in the soil.

Nevertheless, certain metals are key components of some plant enzymes and play roles in various important metabolic processes, such as ureolysis, hydrogen metabolism, methane biogenesis and acetogenesis. Metals may also have other functions that have yet to be discovered in plants. Further, there has been evidence that certain metals help with disease tolerance in plants, although how this happens is not always certain.

Plants with minor deficiencies in desirable metals may display no visual symptoms, but can have reduced growth and plant yield. Plants with significant metal deficiencies will typically display visual symptoms, such as for example shortened internodes, weak shoot growth, decreased expansion of the leaf blade, necrosis of the leaf tips, and death of terminal buds and eventual death of shoots and branches. The leaves may develop a condition called "mouse-ear" in which the leaflets are small with rounded tips vs. long and pointed.

The uptake of metals in plants is typically carried out mainly by root systems via passive diffusion and active transport. The ratio of uptake between active and passive transport varies with the plant species and the form and concentration of desired metal in the soil or nutrient solution, as well as the presence of other metals that may inhibit or compete with absorption of the desired metal, and the pH of the soil or solution.

An ongoing need exists for improved foliar nutritional compositions and methods for applying desired metals to plants.

SUMMARY OF THE INVENTION

According to one aspect of the present invention, there is provided a method of providing nutrients and reducing the incidence of disease in disease in a plant species comprising applying to the foliage of said plant species a water soluble foliar nutritional composition comprising yeast hydrolysate from Brewer's yeast and a metal salt, dissolved in an aqueous solution, such that metal is absorbed into the plant, wherein the metal salt is selected from the salts of a metal selected from the group consisting of copper, nickel, zinc, iron, manganese, and combinations thereof, and wherein the metal salt has a relatively higher solubility for that metal.

According to another aspect of the present invention, there is provided a foliar nutritional composition for foliar application on plants comprising yeast hydrolysate from Brewer's yeast and a metal salt dissolved in an aqueous solution, wherein the metal is plant absorbable, and wherein the metal salt is selected from the salts of a metal selected from the group consisting of copper, nickel, zinc, iron, manganese, and combinations thereof, and wherein the metal salt has a relatively higher solubility for that metal.

DETAILED DESCRIPTION OF THE INVENTION

The present invention provides a foliar nutritional composition and a method for using a foliar nutritional composition for providing nutrients to and preventing disease in plants. The composition and method may also be used for treating disease in plants where the disease is known to be reduced or inhibited by certain metals. The present invention provides a mechanism for introducing metal into the plant itself, through the plant foliage, to enable the plant to resist disease. This invention thus provides the advantages of metal in treating disease without the disadvantages of metal washing off of the leaves and accumulating in the soil.

The foliar nutritional composition of the present invention comprises a metal considered desirable for plant health, from a metal salt, complexed with water soluble amino acids from yeast extract that may be absorbed by plants and used by the plants for nutritional benefits and to resist disease. The invention is believed effective against any plant disease treatable with or responsive to the metal. By selecting a metal salt that has a higher solubility, the foliar nutritional composition will have increased hygroscopicity compared to compositions with other salts of the same metal and a low or lower point of deliquescence. The amino acids are preferably derived from hydrolyzed Brewer's yeast extract. The complex of the metal with the amino acids may neutralize the charge of the metallic ions and may form a compound that occurs naturally in the plant. The method of the invention comprises formulating a composition comprising metal salt and amino acid complex as indicated above and applying an aqueous solution of the composition of the invention onto the plant, preferably by spraying the solution on the plant foliage.

For the plant to be able to internalize or use a metal, the metal must be in a soluble form that can be taken in by the plants along with water. However, metals are known to be insoluble in water and in their pure form cannot be used by plants. Some metal salts are also insoluble in water and thus unusable by plants.

The metal salts used in the method and composition of the present invention are selected from the salts of a metal selected from the group consisting of copper, nickel, zinc, iron, manganese, and combinations thereof.

Various salts of the metals listed above were evaluated and compared for solubility, and therefore, its hygroscopicity and deliquescence. Metal salts showing the highest solubility are the preferred metal salts for use in the invention. With the higher solubility, the compositions have increased hygroscopicity and lower deliquescence. All of the advantages of the invention can only be realized when plants are able to absorb the metal salt, particularly to the degree that none, or an insignificant amount, of the metal salt ends up in the soil, even when the metal salt is complexed with amino acids.

For example, some commercially available compositions use metal sulfates for proving metals to plants. However, metal sulfates have lower solubility than the metal salts used in the foliar nutritional composition of the present invention. In an effort to combat this deficiency, such commercial compositions tend to include surfactants in an effort to improve foliar uptake. Such surfactants may provide additional complications and/or not improve foliar uptake sufficiently. Therefore, growers striving to reach a target metal concentration in plant tissue may be required to use excess amounts of solution.

Accordingly, the inventors have determined that the preferred metal salts have a solubility greater than or equal to 70 g/100 g water at 32° F. Preferably, the metal salts are selected from metal nitrates and metal chlorides.

In a most preferred embodiment of the present invention, the metal salt is comprised of a majority of zinc nitrate. In another most preferred embodiment of the present invention, the metal salt of comprised of a majority of copper nitrate. In a further most preferred embodiment of the present invention, the metal salt is comprised of a majority of zinc chloride.

According to the present invention, adding amino acids, such as glutamic acid and aspartic acid preferably derived from yeast extract, or preferably adding yeast extract hydrolysate most preferably from *Saccharomyces cerevisiae* or Brewer's yeast (which comprises amino acids), to a metal salt in an aqueous solution is believed to significantly enhance the uptake of the metal by the plant upon application to the plant foliage. The combination of amino acids or yeast extract with metal salts in water results in the metal remaining in solution and enables the plant and plant leaves to internalize the metal.

Without wishing to be limited by theory, it is believed that this composition of the present invention provides a water soluble metal complex with the amino acids which effectively neutralizes a positively charged metal so that the negatively charged leaf does not resist uptake of the metal. Rather, when complexed with amino acids, metal is able to move more quickly and easily into and through the plant cell structure. Further, as noted above, the metal and amino acid complex of the invention is hygroscopic, attracting moisture from the air to the leaf surface, for availability of the moisture at the leaf surface to facilitate transfer of the complex into the plant. Again without wishing to be limited by theory, it is believed that once in the plant tissue, the metal remains complexed with amino acid for transport in the xylem for use by the plant in resisting disease.

The particular amino acids and the quantity of each in a yeast hydrolysate will vary depending on the particular yeast employed and the growing medium for the yeast. However, all yeasts provide at least the following amino acids: isoleucine, leucine, lysine, methionine, phenylalanine, threonine, tryptophan, and valine. Yeasts also typically provide arginine, histidine, and cysteine, as well as substantial amounts of aspartic acid and glutamic acid.

The solution of the invention may be sprayed directly onto plants. Since virtually all foliarly applied solution of the invention goes into the plant itself, little if any metal goes into the soil to cause adverse effects, whether for the plant itself or environmentally.

Growers may elect to apply the foliar nutritional composition of the present invention based on growing cycles. However, may of the growers known to the Applicant choose to apply a predetermined amount of foliar nutritional composition according to a target metal concentration, by having plant tissue (e.g., foliage) samples analyzed for determining the metal concentrations prior to spraying. Advantageously, this reduces risk to the environment and reduces growers' costs.

The following non-limiting examples of embodiments of the present invention that may be made and used as claimed herein are provided for illustrative purposes only.

Example 1

The solubility and uptake of the composition of the present invention and comparative commercial products was tested.

The composition of the present invention, embodied by COP-R-QUIK®, available from Natural Ag Solutions in Sebring, Fla., has 12 wt. % copper derived from copper nitrate in an aqueous solution of amino acids.

The inventive composition was compared to commercially available products MAGNA-BON® CS 2005™ and KOCIDE® 3000.

MAGNA-BON® CS 2005™ is available from Magna-Bon® Agricultural Control Solutions (Florida, USA) and is described on its website (www.magnabon.com/cs-2005) as a copper sulfate pentahydrate, acidic, liquid pesticide. An MSDS (dated 5/11) for Magna-Bon CS 2005™ shows a concentration of copper sulfate pentahydrate in the range of 18.81-20.79%.

KOCIDE® 3000 is available from DuPont (Wilmington, Del.) and is typically sold as a granular product intended to be mixed in water prior to use as a fungicide/bactericide. The granular product has 46.1 wt. % copper hydroxide, according to an MSDS (dated Oct. 2, 2009).

Solutions of the inventive composition and the comparative products were prepared to each deliver a theoretical 0.045 wt. % copper (as metal). The prepared solutions were used to treat plots of citrus plants in a greenhouse study of 24 trees, with 6 trees being treated by one of the three test solutions and 6 untreated trees.

After 0.5 day, leaf samples were taken and tested for metal uptake at the University of Florida UF/IFAS Extension Soil Testing Laboratory. Generally, the samples were tested according to the following steps:

Weigh 1.00 g oven-dry, ground plant tissue into a 50 ml porcelain crucible and place in a muffle furnace. Set the temperature to 500° C. and turn the furnace on. Once the temperature of the oven reaches 500° C., allow samples to ash for a minimum of 5 hours (not to exceed 16 hours). Shut oven off and allow the oven to cool. Once the oven is below 200° C., carefully open the oven to allow further cooling, without disturbing the ashed samples.

Once the ashed samples reach room temperature, remove from oven and moisten with approximately 5 drops of distilled water using an eyedropper. Add 5 mL of 6M hydrochloric acid. Allow the resulting suspension to stand for at least 30 minutes before proceeding.

Transfer the solution containing the ash to a 50 mL volumetric flask. Rinse with distilled water and add to volumetric flask. Bring volume to 50 mL with distilled water. Mix thoroughly. Transfer an aliquot of sample to an appropriate container for analysis by Inductively Coupled Plasma (ICP) Spectrometer.

The results are presented in Table 1. The results show that the composition of the invention was superior in delivering copper to the plant, with 36% to 170% higher post-treatment leaf copper levels than that of the comparative commercially available products.

TABLE 1

| Treatment | Copper Solubility (g/100 g water at 32° F.) | Mean Copper in Post Leaf Treatment (mg/kg) |
|---|---|---|
| Inventive Composition | 84 | 235.8 |
| MAGNA-BON ® CS 2005 ™ (Comparative) | 23 | 173.9 |
| KOCIDE ® 3000 (Comparative) | 0 | 87.4 |
| Control | | 10.6 |

Example 2

A greenhouse study was conducted on citrus plants. Three solutions containing different sources of zinc were tested for metal solubility and uptake into the leaf of the citrus plants, with one set of control pots. The study was replicated six times.

The nutrient solutions tested were: Solution A of the invention was zinc nitrate, Comparative Solution B was zinc sulfate, and Comparative Solution C was a tank-mixed zinc sulfate plus 1 wt. % K2O, resulting in an insoluble precipitate. The solutions were prepared to each provide a theoretical 0.1 wt % Zn (as metal).

Each plant was sprayed with the respective nutrient solution and analyzed 0.1, 1, 2 and 3 days after spraying. The entire study was repeated three times.

Leaf samples were taken and analyzed at the University of Florida UF/IFAS Extension Soil Testing Laboratory in the manner described in Example 1 to determine the plant's uptake of zinc.

The results are demonstrated in Table 2. The results show that the composition of the invention was superior in delivering zinc to the plant, with 57% to 250% higher post-treatment leaf zinc levels than that of the comparative zinc salts.

TABLE 2

| Treatment | Zinc Solubility (g/100 g H2O at 32° F.) | Adsorption of Zn by Plant demonstrated by Zn Concentration in Leaf (mg/kg) | | | |
|---|---|---|---|---|---|
| | | Trial 1 | Trial 2 | Trial 3 | Mean of Statistical Means (Mean, mg/kg) |
| A | 98 | 521.81 | 175.08 | 179.36 | 292.1 (177.2) |
| B (Comparative) | 42 | 367.48 | 83.66 | 105.92 | 185.7 (131.5) |
| C (Comparative) | 0 | 150.09 | 10.30 | 61.90 | 84.1 (51.1) |
| Control | | 65.35 | 27.60 | 21.31 | 38.1 (24.4) |
| LSD* | | 30.19 | 11.88 | 9.99 | |

*LSD = Least Significant Difference

Example 3

A greenhouse study was conducted on pecan plants. Three solutions containing different sources of zinc were tested for metal solubility and uptake into the leaf of the pecan plants, with one set of control pots.

Solution A representing a composition of the present invention, embodied by NUTRE-QUIK® Zinc, available from Natural Ag Solutions in Sebring, Fla., has 23 wt. % zinc derived from zinc chloride in an aqueous solution of amino acids.

The inventive composition was compared to zinc nitrate (Comparative Solution B), also containing a metal salt according to the present invention, but without the aqueous solution of amino acids, and zinc sulfate (Comparative Solution C).

Solutions were used to treat plots containing the same elemental zinc concentrations, using the three different sources of nutritional zinc noted above. The amount of solution was selected to provide a theoretical 0.091 wt. % zinc (as metal) from each treatment solution.

24 pecan plants were used in the study, with six plants sprayed with each nutrient solution and six plants left untreated as a control set. Leaf samples were taken 0.5 day after the spray and analyzed at the University of Florida UF/IFAS Extension Soil Testing Laboratory in the manner described in Example 1 for metal uptake.

The results are demonstrated in Table 3. The results show that the composition of the invention was superior in delivering zinc to the plant, with 6% to 27% higher post-treatment leaf zinc levels than that of the comparative zinc salts.

TABLE 3

| Treatment | Zinc Solubility (g/100 g H2O at 32° F.) | Adsorption of Zn by Plant demonstrated by Zn Concentration in Leaf (Mean, mg/kg) |
|---|---|---|
| Inventive Composition | 342 | 513.97 |
| ZnNO3 (Comparative) | 98 | 402.81 |
| ZnSO4 (Comparative) | 42 | 484.48 |
| Control | | 158.16 |

The foregoing description of the invention is intended to be a description of preferred embodiments. Various changes in the details of the described compositions and methods of use can be made without departing from the intended scope of this invention as defined by the appended claims.

What is claimed is:

1. A method of providing nutrients and reducing the incidence of disease in a plant species comprising applying to the foliage of said plant species a water soluble foliar nutritional composition consisting of yeast hydrolysate from Brewer's yeast and a metal salt, dissolved in an aqueous solution, such that metal is absorbed into the plant, wherein the metal salt is selected from the group consisting of nitrates, chlorides and combinations thereof of the metal selected from the group consisting of nickel, zinc, iron, manganese, and combinations thereof;
   wherein the solubility of metal salt is greater than or equal to 70 g/100 g water at 32° F.; and
   wherein the metal salt is comprised of a majority of zinc nitrate.

* * * * *